United States Patent
Miklós et al.

(10) Patent No.: US 10,757,589 B2
(45) Date of Patent: Aug. 25, 2020

(54) METHOD AND A FIRST NETWORK ENTITY FOR HANDLING CONTROL PLANE CONTEXT INFORMATION

(71) Applicant: Telefonaktiebolaget LM Ericsson (publ), Stockholm (SE)

(72) Inventors: György Miklós, Pillsborosjenö (HU); János Harmatos, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 165 days.

(21) Appl. No.: 15/755,889

(22) PCT Filed: Oct. 14, 2015

(86) PCT No.: PCT/SE2015/051086
§ 371 (c)(1),
(2) Date: Feb. 27, 2018

(87) PCT Pub. No.: WO2017/065654
PCT Pub. Date: Apr. 20, 2017

(65) Prior Publication Data
US 2018/0242175 A1    Aug. 23, 2018

(51) Int. Cl.
*H04W 24/04* (2009.01)
(52) U.S. Cl.
CPC .................. *H04W 24/04* (2013.01)
(58) Field of Classification Search
None
See application file for complete search history.

(56) References Cited

U.S. PATENT DOCUMENTS

| | | | |
|---|---|---|---|
| 2010/0220656 A1 | 9/2010 | Ramankutty et al. | |
| 2011/0235505 A1 | 9/2011 | Eswara et al. | |
| 2012/0115492 A1* | 5/2012 | Liao | H04W 8/30 455/445 |
| 2013/0083650 A1* | 4/2013 | Taleb | H04W 24/04 370/218 |

(Continued)

FOREIGN PATENT DOCUMENTS

| | | |
|---|---|---|
| EP | 2346215 A1 | 7/2011 |
| WO | 2013110352 A1 | 8/2013 |

OTHER PUBLICATIONS

International Search Report and Written Opinion for International Patent Application No. PCT/SE2015/051086, dated Jun. 16, 2016, 13 pages.

(Continued)

*Primary Examiner* — Kenny S Lin
(74) *Attorney, Agent, or Firm* — Withrow & Terranova, PLLC

(57) ABSTRACT

The disclosure relates to a method for a first network entity of handling control plane context information relating to wireless devices. The first network entity is configured with a first context replication domain. The method comprises handling control plane context information relating to one or more wireless devices, and communicating, with each additional network entity also configured with the first context replication domain, changes of control plane context information for the one or more wireless devices. The disclosure also relates to corresponding computer program, computer program product and first network entity.

17 Claims, 6 Drawing Sheets

(56) References Cited

U.S. PATENT DOCUMENTS

| | | | |
|---|---|---|---|
| 2013/0188555 A1* | 7/2013 | Olsson .................... | H04W 8/30 |
| | | | 370/328 |
| 2015/0065106 A1* | 3/2015 | Catovic .................. | H04W 8/22 |
| | | | 455/418 |
| 2015/0146519 A1* | 5/2015 | Zakrzewski ............ | H04W 8/30 |
| | | | 370/221 |

OTHER PUBLICATIONS

Extended European Search Report for European Patent Application No. 15906321.3, dated Apr. 23, 2019, 8 pages.

* cited by examiner

METHOD AND A FIRST NETWORK ENTITY FOR HANDLING CONTROL PLANE CONTEXT INFORMATION

This application is a 35 U.S.C. § 371 national phase filing of International Application No. PCT/SE2015/051086, filed Oct. 14, 2015, the disclosure of which is incorporated herein by reference in its entirety.

TECHNICAL FIELD

The technology disclosed herein relates generally to the field of communications system architecture, and in particular to a method of handling control plane context information, and corresponding first network entity, computer program and computer program product.

BACKGROUND

Current mobile networks are based on an architecture where a core network (CN) is separated from a radio access network (RAN). The CN is further separated between a user plane (UP) and a control plane (CP), denoted CN UP and CN CP, respectively. For instance, in the case of Long Term Evolution/Evolved Packet Core (LTE/EPC) mobile networks, the RAN comprises eNodeBs (or eNBs), which act as base stations, BS, the CN CP comprises a Mobility Management Entity (MME), while the CN UP comprises a Serving Gateway (SGW) and a Packet Data Network Gateway (PGW). FIG. 1 illustrates this conventional architecture. It is noted that other entities may also be included. For instance, the CN CP may comprise also other entities (not illustrated), e.g. a Home Subscriber Server (HSS) and a Policy and Charging Rules Function (PCRF).

CN functionality is commonly deployed at a centralized location and is hence separated from RAN functionality that needs to be distributed at the base station (BS) sites. The CN control plane functionality comprises e.g. termination of non-access stratum (NAS) signaling with wireless devices and handling the associated signaling procedures, and functions such as setting up and updating of the user plane path for a user equipment's (UE's) data traffic. Separation of UP and CP in the CN helps to independently scale functions that require different types of implementations, and also allows operators to integrate equipment from different vendors. Such a split between RAN and CN, as well as the separation between UP and CP, simplifies network operations and has served operators well in providing public mobile broadband services.

The range of services provided by mobile networks is extending into other use cases, such as industrial applications. These non-traditional usage scenarios have been in the focus in the definition of the next generation of mobile network technologies, commonly referred to as 5G. New use cases comprise, for instance, industry automation use cases where field devices such as manufacturing robots, sensors or actuators are connected over mobile networks to a central controller, where the mobile network provides highly reliable and extremely low delay communications services.

In such a local network, separate entities for RAN (entities such as BS), CN UP and CN CP would be too complex and expensive to operate. Further, separate entities increase the risk of failure and also incur additional delays.

Collocating BS, CN UP and CN CP functionality in a common access node (AN) platform is possible, but for efficient handling of mobility between multiple such common AN platforms, additional functionality is needed. During mobility, a wireless device may be handed over from one common AN platform to another common AN platform. In case the CN CP functionality remains served by the old common AN platform, the system would need to rely on both the old common AN platform and the new common AN platform for operation. This is sub-optimal from a reliability point of view: it is preferable if the system relies on a single common AN platform only, as that reduces the number of failure points.

Another possibility is to re-locate the CN CP functionality to the new common AN platform after mobility, which increases reliability as the wireless device would not be dependent on a second common AN platform for CN CP functionality. The wireless device may move from the service area of a first common AN platform to the service area of a second common AN platform and then to a third common AN platform. As the wireless device moves, the corresponding control plane context of the wireless device is relocated. This is the solution e.g., in case of MME relocation during UE mobility with pool area change. For industrial applications, a solution could be to collocate the control plane functionality with the BS in a combined AN platform to achieve simpler operation and higher reliability. In such solution, handovers between base stations also imply context transfer for the CP.

However, CN CP relocation procedures from one AN platform to another imply a significant signaling overhead. According to existing system procedures, a relocation of the CN CP would need to be signaled separately to the UE, for which the assignment of a new globally unique temporary identifier (GUTI) is needed, and to the HSS to update the UE location. Such extra signaling loads the mobile network.

Further, a relocation of the CN CP might also be needed during a service request procedure. Such relocation is not possible today with the service request procedure as defined in the specifications, and extending the service request procedure for this relocation may make the procedure slower, which is a disadvantage as the service request is a time-critical action wherein the delay of the idle state to connected state transition needs to be kept low.

SUMMARY

An objective of the present teachings is to address the above situation and to solve or at least alleviate at least one of the above mentioned problems. It is a particular objective to provide a solution meeting the changing service types and demands in communications systems.

The objective is according to an aspect achieved by a method for a first network entity of handling control plane context information relating to wireless devices. The first network entity is configured with a first context replication domain. The method comprises handling control plane context information relating to one or more wireless devices, and communicating, with each additional network entity also configured with the first context replication domain, changes of control plane context information for the one or more wireless devices.

The method provides several advantages. For instance, the method provides a higher reliability by avoiding an additional point of failure. If any of the first network entity and additional network entities fails (all configured with the same context replication domain), another such network entity can take over its role, which thereby provides protection against node failure. The method also simplifies various system procedures owing to the underlying replication procedure: there is no need to add extra signaling messages for state synchronization since all network entities configured with the same context replication domain already have the context information relating to the wireless devices served within the context replication domain.

The objective is according to an aspect achieved by a computer program for a first network entity for handling control plane context information relating to wireless devices. The computer program comprises computer program code, which, when executed on at least one processor on the first network entity causes the first network entity to perform the method as above.

The objective is according to an aspect achieved by a computer program product comprising a computer program as above and a computer readable means on which the computer program is stored.

The objective is according to an aspect achieved by a first network entity for handling control plane context information relating to wireless devices. The first network entity is configured with a first context replication domain. The first network entity is further configured to: handle control plane context information relating to one or more wireless devices, and communicate, with each additional network entity also configured with the first context replication domain, changes of control plane context information for the one or more wireless devices.

Further features and advantages of the embodiments of the present teachings will become clear upon reading the following description and the accompanying drawings.

DETAILED DESCRIPTION

Figure 1:
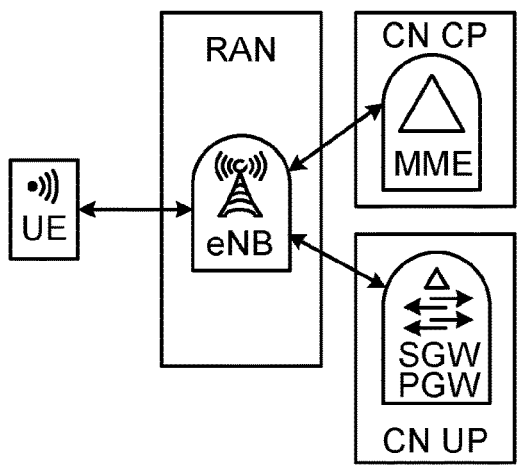
FIG. 1 illustrates a prior art architecture of a communications system.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

From the background section it is clear that in, for instance, industrial automation scenarios, i.e. localized industrial deployments, there is a desire and need to simplify the network setup and operations. According to embodiments of the present invention, the control plane functionality may be provided by localized entities, hereinafter referred to as CP entity. In some embodiments it may be advantageous to collocate the CP entity with the base station (BS) functionality of the RAN. In this case, only a single type of node, in the following denoted a CP access node (AN), would be deployed in a local industrial network for both RAN functions and CN CP functions, making network operations simpler by avoiding the deployment and operation of dedicated CN CP nodes. It is noted that the present teachings also provides local CP entities which are not collocated with the BS functionality. Reducing the number of network entities reduces the delay of the communication and improves system reliability by eliminating additional points of failure. In other embodiments, the CP entity may also include CN UP functionality. In still other embodiments, the CP entity may also include CN UP functionality as well as BS functionality.

Briefly, a system is proposed where an entity, here referred to as CP entity, comprises CN CP functionality. Such CN CP functionality may, for instance, comprise the termination of NAS signaling with the wireless device and handling the associated system procedures. The CP entity is responsible for a limited service area, and context information, i.e., memory state associated with a given wireless device, is replicated in all other local CP entities belonging to a given domain (in the following denoted context replication domain). Within the given context replication domain some of those local CP entities may serve a different area. Any change in the state for one wireless device of one CP entity is automatically propagated (replicated) to the other local CP entities in the context replication domain. A context replication domain here corresponds to the set of local CP entities which are subject to the same context replication process. As a particular example, the local CP entities in a local industry network may be part of a single context replication domain. The concept of context replication domain is used here as there may be many local CP entities within an operator network and it is not necessary that the context replication is performed over all the local CP entities within the whole operator network.

In this way, the CN CP information remains up-to-date for all wireless devices in all the local CP entities in a given context replication domain. When a wireless device moves from one CP entity to another CP entity in the context replication domain, there is no need to perform a relocation of the CN CP context, as the context information is already available in the new CP entity.

In a preferred embodiment, the CP entity is collocated with the BS entity and the CP entity's service area may (but need not) correspond to the coverage of the BS entity. As mentioned earlier, a CP entity collocated with the BS entity is in the following denoted CP AN. The CP entity being collocated with the BS entity, i.e. the CP AN, further simplifies the network deployment and operation.

Figure 2:
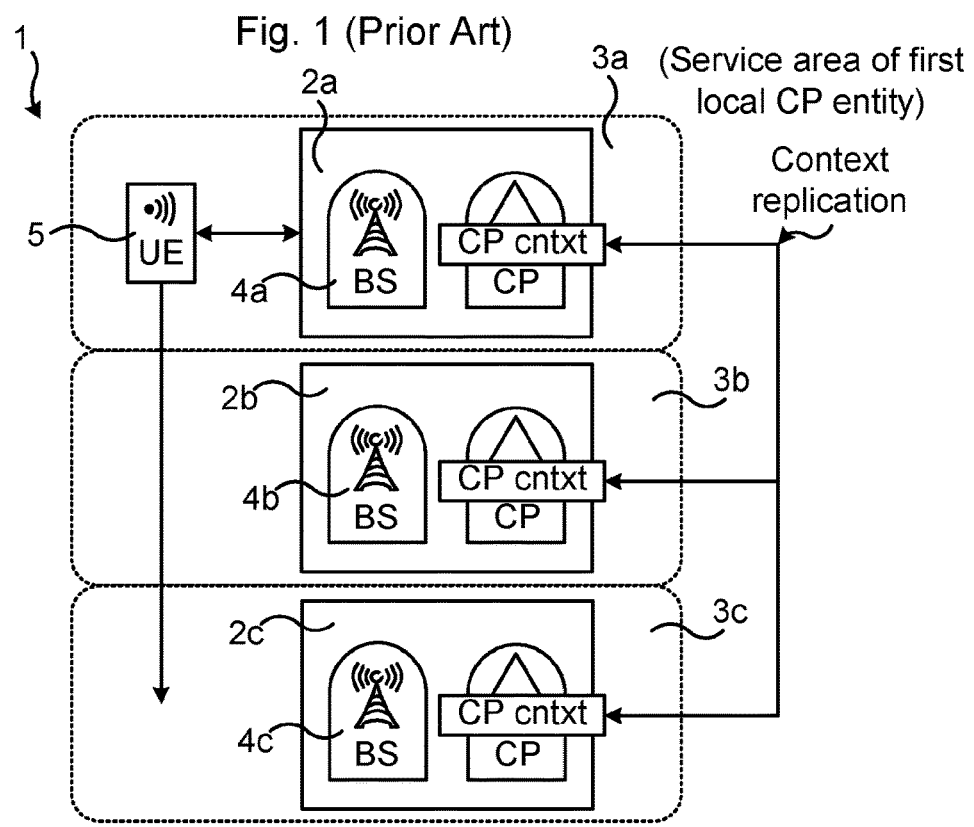
FIG. 2 illustrates an architecture and an environment in which embodiments according to the present teachings may be implemented.

FIG. 2 illustrates an architecture and an environment in which embodiments according to the present teachings may be implemented. A network 1 comprises a first CP entity 2a, a second CP entity 2b and a third CP entity 2c as illustrated. Each CP entity 2a, 2b, 2c has a corresponding service area, denoted by reference numerals 3a, 3b and 3c, respectively. The local CP entities 2a, 2b, 2c may be interconnected in a wired or wireless manner for exchange of information, e.g. the control plane contexts. In some embodiments, the CP entity 2a, 2b, 2c comprises only CN CP functionality such as the termination of NAS signaling with the wireless device and handling the associated system procedures, attachment and detachment of wireless devices, transitions between connected and idle states, mobility mechanisms in connected and in idle states, managing bearers for Quality of Service (QoS) differentiation, handling subscription parameters, securing the communication using encryption and/or integrity protection etc. In other embodiments, and as illustrated in FIG. 2, the CP entity 2a, 2b, 2c is collocated with a BS entity, i.e. also comprises BS functionality, in which case the CP entity is denoted CP AN.

As a wireless device 5 moves from the service area 3a of the first CP entity 2a to the service area 2b of the second CP entity 2b and later to the service area 3c of the third CP entity 2c, there is an up-to-date control plane context already available in the new CP entity owing to an underlying operation of a context replication process according to the present teachings. As mentioned earlier, a CP entity 2a, 2b, 2c may correspond to the MME's control plane functionality or a subset of that functionality of today's LTE/EPC networks or corresponding functionality in future 5G or other types of networks; and in a preferred embodiment the CP entity 2a, 2b, 2c is co-located with the BS functionality (eNB in LTE networks) as illustrated in FIG. 2.

The terminology "service area" 3a, 3b, is used, where a CP entity has a service area and the CP entity is responsible for the UEs in its service area for handling e.g., NAS signaling. It is noted that there are other CP entities in the same context replication domain with an entirely different service area or an overlapping service area. The control plane context of the UE is known and kept up to date in all the local CP entities in the domain, including the local CP entities that do not have the UE in their service area. That is, changes in the control plane context are communicated to all other local CP entities in the context replication domain irrespective of whether the UE is in their service areas.

Next, various embodiments of the context replication process according to the present teachings will be described.

The local CP entities 2a, 2b, 2c need to be configured with the context replication domain in which the CP context replication according to the present teachings is to take place. A context replication domain may, for instance, correspond to a local industrial network deployment. The configuration may be provided e.g., by a suitable Operation and Management (O&M) system that is responsible for setting up and managing the configuration parameters of the entities of the network 1. Each CP entity 2a, 2b, 2c needs to be configured with the context replication domain in which the CP context replication process is configured. To this end, the CP entity 2a, 2b, 2c may be configured with an address or multiple addresses that correspond to the other local CP entities 2a, 2b, 2c in the same context replication domain. This can be done in different ways, two examples of which are given in the following:

Unicast example: Each CP entity 2a, 2b, 2c is configured with a list of addresses or names of the other CP entity 2a, 2b, 2c in the context replication domain. The address may be an Internet Protocol (IP) address, a Media Access Control (MAC) address; or a name can be configured by an operator, which name can be mapped to an address, e.g., using a Domain Name System (DNS) system. Whenever a CP entity 2a, 2b, 2c is added to or removed from the context replication domain, the configuration of each of the other local CP entities 2a, 2b, 2c needs to be updated. In the unicast case, a change in the UE context in one CP entity 2a, 2b, 2c can be communicated to the other local CP entities 2a, 2b, 2c by using a reliable unicast transport protocol such as Transmission Control Protocol (TCP) towards the other local CP entities 2a, 2b, 2c one by one.

Multicast example: It is also possible to define a multicast group for the set of local CP entities 2a, 2b, 2c in the context replication domain, e.g., using IP multicast. Each CP entity 2a, 2b, 2c joins the multicast group for the control plane context replication process. Whenever a CP entity 2a, 2b, 2c is added to or removed from the context replication domain, the group membership of the given multicast group is updated. In the multicast case, a change in the UE context in one CP entity 2a, 2b, 2c can be communicated to the other local CP entities 2a, 2b, 2c by a reliable multicast transport protocol such as Pragmatic General Multicast (PGM) protocol.

When the UE context changes in a CP entity 2a, 2b, 2c, e.g. due to a system procedure or an event, the change is communicated to the other local CP entities 2a, 2b, 2c in the context replication domain which also hold the context for the UE. Preferably, it is only the changed information element (IE) within the UE context that is communicated to the other local CP entities 2a, 2b, 2c, not the full UE context. For instance, if one CP entity 2a, 2b, 2c changes only one parameter in the UE context and the rest of the UE context remains unchanged, only the new value of the single parameter is sent to the other local CP entities 2a, 2b, 2c. In this way, it is possible to have a first CP entity 2a handling the change of one parameter and another CP entity 2b handling the change of another parameter, where both changes are communicated to all other local CP entities 2a, 2b, 2c. This could occur e.g., during change of subscription or during paging as will be described later.

In order to optimize the context replication process, it is possible to allow several context changes to be replicated at the same time, thereby reducing the associated signaling load. The CP entity 2a, 2b, 2c may therefore wait for a configurable amount of time before replicating the UE context in order to allow more than one change to be propagated to the other local CP entities 2a, 2b, 2c. The amount of time may depend on the actual procedure, e.g. it is possible to wait for a full procedure (e.g. mobility procedure) to complete so that all parameter changes can be updated simultaneously in a single update. In other embodiments, all changes are replicated immediately to avoid any delay, i.e. it is possible to skip waiting for other changes.

When a new CP entity 2a, 2b, 2c is to be deployed in an existing network, the new CP entity 2a, 2b, 2c needs to be synchronized with the UE contexts of all UEs registered in the network 1. This could be accomplished by downloading the UE contexts from one of the other local CP entities 2a, 2b, 2c in the context replication domain. Alternatively, the set of UEs could be grouped e.g., based on their identities, and one group of the UE contexts can be downloaded from one of the local CP entities 2a, 2b, 2c, in the same context replication domain while another group of the UE contexts can be downloaded from another of the local CP entities 2a, 2b, 2c. Thereby the load associated with synchronizing the UE context information is reduced.

Various types of UE context information may be subject to replication between the local CP entities 2a, 2b, 2c. The UE context information comprises basic information such as security context (updated after authentication), bearer context (updated after bearer setup or modification/removal) and subscription information (updated after signaling with the HSS, including e.g., restriction information). All such information may be subject to the replication process. In the following a few specific parameters are highlighted that may also be subject to the context replication process according to the present teachings. It is however noted that the present teachings are not limited to these given examples.

NAS COUNT: NAS messages between the UE and the CP entity 2a, 2b, 2c (MME in the standardized architecture for LTE/EPC) are associated with a counter that is incremented by one for each NAS message. There is a separate counter for uplink and for downlink NAS messages. The counter is e.g. used as an input to NAS integrity and ciphering algorithms. When the NAS COUNT changes (either for uplink or for downlink) in an CP entity 2a, 2b, 2c, the updated value may be synchronized with (i.e. replicated to) the other local CP entities 2a, 2b, 2c as part of the context replication process.

Serving RAN node: In case the UE is connected in RAN, the identity of the serving RAN node is part of the UE context, along with the identifier of the RAN-CN interface when applicable (i.e., MME Si-AP UE ID). For embodiments wherein the RAN node is collocated with the CP entity, this information can be stored as a "serving CP AN" parameter. For UEs that are idle, this parameter takes a "null" value. This parameter is also subject to replication, and in that way each CP entity 2a, 2b, 2c has a synchronized view about the currently serving RAN node.

Paging attempts: when paging has been initiated, this is reflected in a parameter such as the number of paging attempts which is increased from 0 to 1. In case of paging retransmissions, this value can be further increased. This parameter could also subject to replication, and in this way local CP entities 2a, 2b, 2c have a synchronized view about when a paging process in underway. This could be useful to prevent two local CP entities 2a, 2b, 2c performing paging simultaneously for the same UE.

Normally, there is one CP entity 2a, 2b, 2c that has the most up-to-date state of the UE context, typically the one that is serving a given UE. Changes in that UE context are replicated in other local CP entities 2a, 2b, 2c.

In the following, three cases (handover, idle mode mobility and HSS initiated signaling) are described which reflect different scenarios regarding which CP entity 2a, 2b, 2c is updating other local CP entities 2a, 2b, 2c about the most up-to-date state information for the UE. In the description focus lies on the control plane aspects and do not address how user plane is handled (although it is briefly mentioned later).

Figure 3:
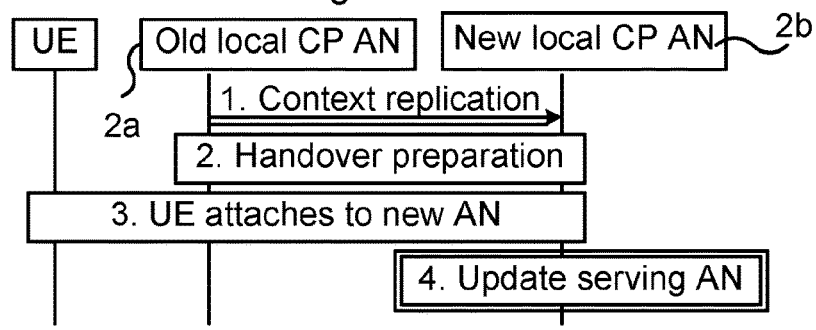
FIG. 3 illustrates a signaling diagram of context replication during handover according to the present teachings.

Handover:

FIG. 3 illustrates a signaling diagram of context replication during handover according to the present teachings. In case of a handover from an old CP entity 2a to a new CP entity 2b, the new CP entity 2b will take over the role of serving the UE. There is no need for an explicit context transfer of the CP context from the old CP entity 2a to the new CP entity 2b, since the new CP entity 2b already holds the CP context thanks to the context replication process (arrow 1 of FIG. 3) according to the present teachings. The fact that the context is replicated is indicated by the arrow 1 being double lined. It is however noted that RAN specific state information is not necessarily subject to the replication process, and RAN context state can be transferred to the new RAN node (e.g. BS or eNB) as defined by current specifications. After the handover procedure, conventionally involving handover preparation and the UE attaching to the new RAN node (boxes 2 and 3 of FIG. 3), the serving RAN node information (denoted serving AN) will be updated (box 4 of FIG. 3) to reflect the current status, and this change is replicated in the other CP entities, as indicated by the double lined box 4. This handover process is illustrated in FIG. 3, for the case when the RAN nodes are collocated with the local CP entities 2a, 2b (old local CP AN and new local CP AN, respectively).

In the following signaling diagrams, as for the signaling diagram of FIG. 3, double lines for arrows and boxes indicates that a replication process is performed.

Figure 4:
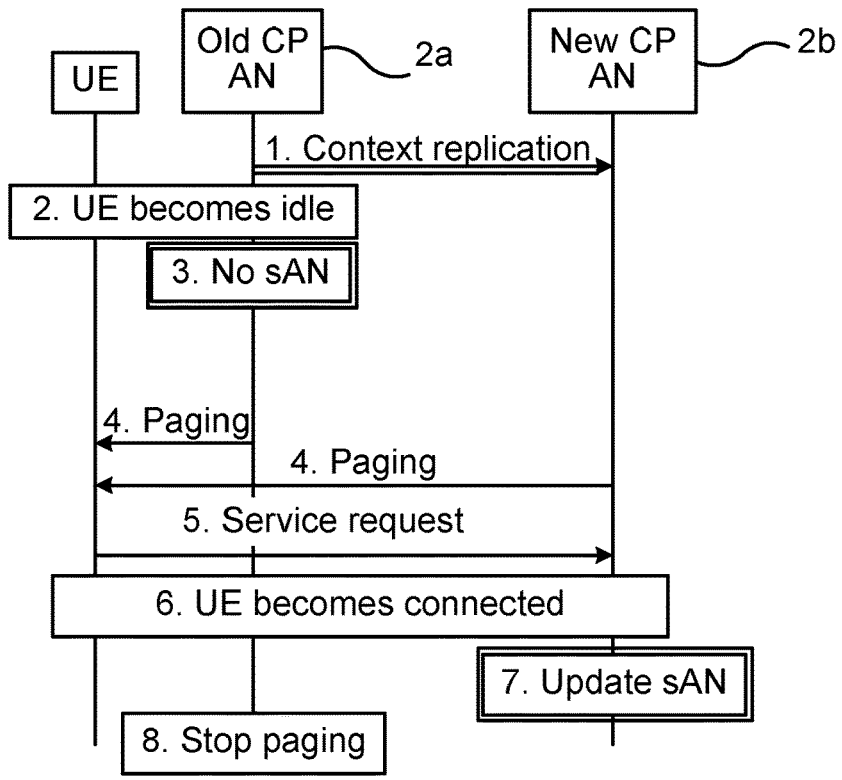
FIG. 4 illustrates a signaling diagram of context replication during idle mode mobility according to the present teachings.

Idle Mode Mobility:

FIG. 4 illustrates a signaling diagram of context replication during idle mode mobility according to the present teachings. Again, the case of the RAN nodes being collocated with the local CP entities 2a, 2b is used as example. In case of mobility in idle mode, the process may be slightly more complex, as illustrated in FIG. 4. At arrow 1, the context replication according to the present teachings is illustrated. The UE becomes idle at an old CP AN (box 2); in this case the serving CP AN parameter becomes null (no serving CP AN, box 3), which is replicated in other CP ANs (not explicitly illustrated). When the UE is to be paged, the paging process may be initiated from the old CP AN 2a, as that was the last point where the UE was seen. The paging is carried out at the old CP AN 2a, and also at other CP ANs 2b (arrows 4). The paging at other CP ANs may be triggered by either a signaling message from the old CP AN, or via context replication indicating that the UE should be paged. In case the UE has moved to a new CP AN 2b, the UE responds to the paging with a Service Request message to a new AN 2b (arrow 5), and the UE then becomes connected at the new CP AN 2b (box 6). The new CP AN 2b updates its serving CP AN parameter, and that change is replicated in other CP ANs 2a. The old CP AN 2a will notice that the serving CP AN 2b has been updated (box 7) implying that the UE has become connected, and as a result the old CP AN 2a stops paging (box 8). In this procedure, both old CP AN 2a and the new CP AN 2b has performed context replication; the new CP AN 2b at the end has a more up-to-date view of the UE's context. During the process, the old CP AN 2a may also update the UE's context, e.g. with the number of paging retransmissions (not explicitly shown in the figure). The change in the context of the new CP AN 2b, replicated to the old CP AN 2a, helps to properly complete the process by stopping the paging at the time when it is no longer needed.

Figure 5:
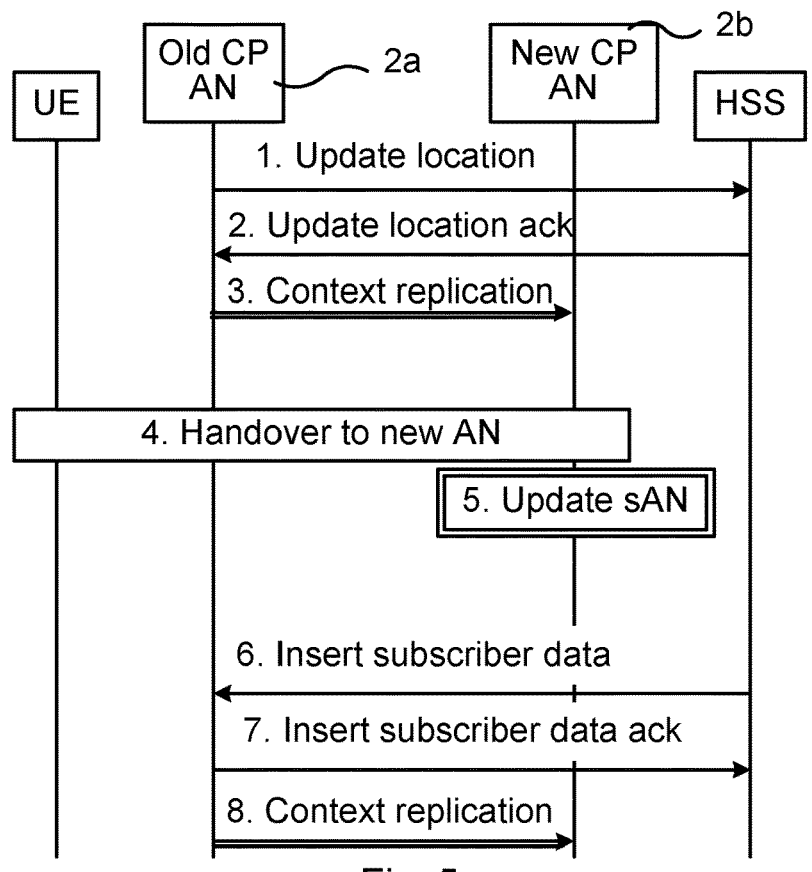
FIG. 5 illustrates a signaling diagram of context replication during HSS subscription updating according to the present teachings.

HSS Initiated Signaling:

FIG. 5 illustrates a signaling diagram of context replication during HSS subscription updating according to the present teachings. Again, the case of the RAN nodes being collocated with the local CP entities 2a, 2b is used as example. The third case represents a rather infrequent case when the HSS initiates changes towards the local CP AN, e.g. due to a change in the UE's subscription. During mobility procedures, the changes in the identity of the CP AN with the most up-to-date context information for the UE is not communicated to the HSS. This helps to reduce the signaling, and it is anyway difficult to prevent the HSS from communicating to an old CP AN due to the context replication process. The old CP AN 2a thus updates the UE location towards the HSS (arrow 1), which the HSS acknowledges (arrow 2). At arrow 3, the location update is replicated by the old CP AN 2a. In this case, the UE has been handed over (box 4) from an old CP AN 2a to a new CP AN 2b since the last communication with the HSS. This update in serving AN is replicated (box 5). When the HSS indicates a change in the subscription, it signals to the old CP AN 2a (arrow 6), which the old CP AN 2a acknowledges (arrow 7). The old CP AN 2a in turn uses the context replication process (arrow 8) to update the other CP ANs 2b. In this way, subscription changes are successfully updated in the CP ANs, without having to signal each handover to the HSS. As mentioned above, context replication messages only update the parameters that actually change. In this way, the old CP AN 2a only replicates the changed subscription parameters; in case the new CP AN 2b updates other parameters that have hanged in the meantime (e.g. related to handover from old CP AN 2a to new CP AN 2b, as illustrated at boxes 4 and 5), the two replication processes do not conflict as they correspond to different parameters. An advantage is that the HSS does need to know with CP AN is the serving CP AN, it may just sent the subscription changes to any CP AN and the changes are propagated (arrow 8) to the other CP ANs within the context replication domain.

For sake of completeness, also a suggested user plane handling is indicated in the following. There can be several options as to how the user plane traffic is handled in case of the mobility of the UE from the service area of one RAN node to the service area of another RAN node.

Figure 6:
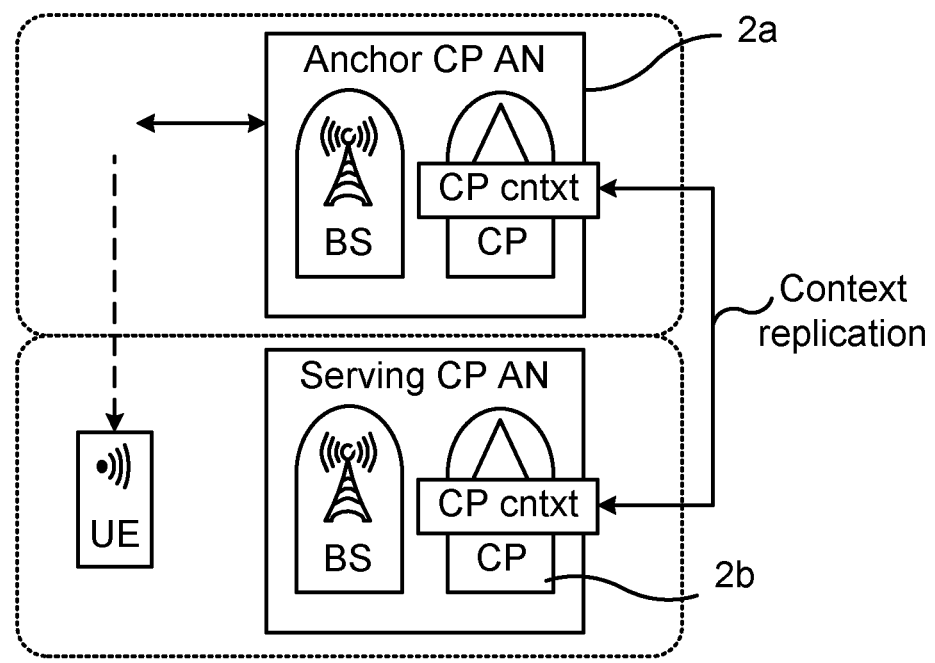
FIG. 6 illustrates context replication during mobility with a permanent anchor node according to the present teachings.

FIG. 6 illustrates context replication during mobility with a permanent anchor CP AN node according to the present teachings. The control plane context is replicated as have been described and as indicated in the FIG. 6. The traditional way of handling mobility is to keep an old RAN node as a permanent anchor point, as shown in FIG. 6. It is noted that it possible to have a user plane anchor point which is separate from a CP AN, e.g. have a separate gateway (GW) node which acts as an anchor point so that the GW is not collocated with the CP functionality in the CP AN. However, in FIG. 6 a preferred embodiment is illustrated where the CP AN also includes user plane functionality so that it can serve as an anchor point. Keeping the user plane anchor point at the old CP AN 2a (anchor CP AN) allows a simple handling of the mobility where the IP address of the UE can be kept and the IP point of presence (access point to Internet) for the UE can be maintained at the anchor CP AN 2a. However, after mobility the UE will depend on both the serving CP AN 2b and on the anchor CP AN 2a, hence from a reliability point of view this approach is not optimal as it is exposed to the failure of both CP ANs 2a, 2b.

Another option for the handling of user plane traffic for UE mobility is to replace the old connection with a new one at the serving CP AN, described next with reference to FIG. 7.

Figure 7:
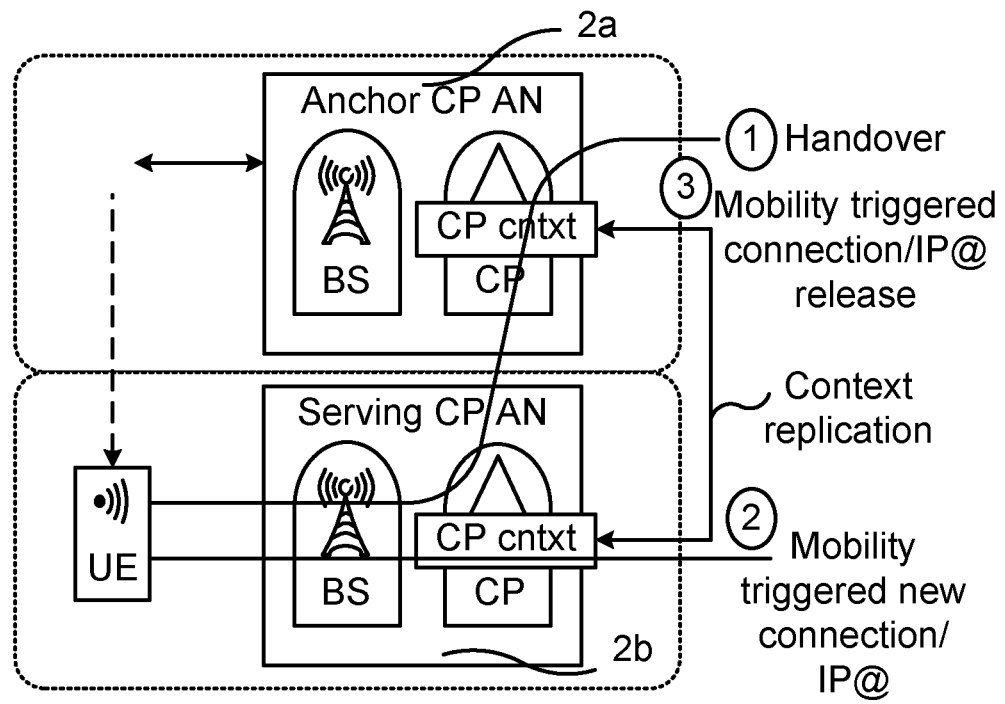
FIG. 7 illustrates context replication during mobility with a temporary anchor node according to the present teachings.

FIG. 7 illustrates context replication during mobility with a temporary anchor node according to the present teachings. The replacement of the old connection with a new one at the serving CP AN 2b does not have to be done immediately after mobility (handover indicated at encircled numeral 1), it is possible to wait for a configurable amount of time, hence the solution can be regarded as a temporary anchor solution. Also, it is possible to maintain a transitional period where the new connection is already established and used for new communications, while the old connection is also maintained for old communication sessions, thereby allowing a gradual change. The mobility triggered new connection/IP address is indicated at encircled numeral 2, and the corresponding mobility triggered connection/IP address release is indicated at encircled numeral 3. An advantage of this approach is that it provides higher reliability due to the use of the new connection at the new CP AN 2b, since the communication is only dependent on a single CP AN 2b. On the other hand, the change of the connection implies a change of the IP address, which needs to be handled by the applications running on the UE. However, many applications can easily handle such change of the IP address.

The context replication according to the present teachings enables several system simplifications to be made as will be described next. Owing to the context replication process, it is possible to simplify some system procedures by skipping some messages, since the necessary information can be extracted from the replicated context. In some cases this might also reduce the delay of the procedures. A few such examples are given in the following. The examples show one or more separate anchor points that handle the user plane. The examples may be applied both for the permanent anchor case and the temporary anchor case described above.

Figure 8:
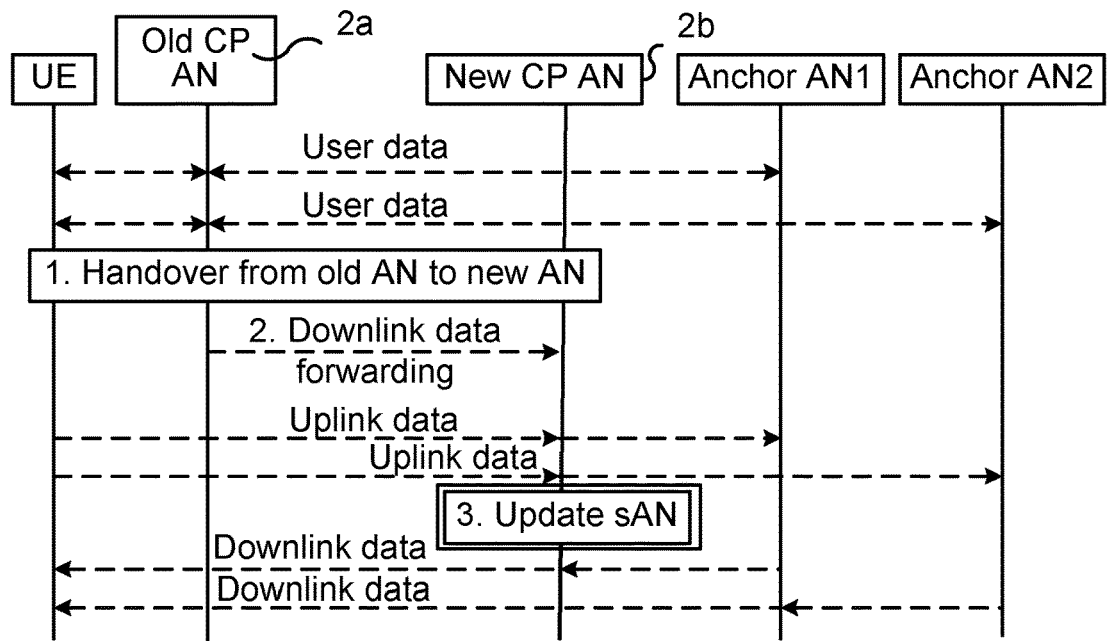
FIG. 8 illustrates a signaling diagram of a system simplification during handover according to the present teachings.

FIG. 8 illustrates a signaling diagram of a system simplification during handover according to the present teachings. The signaling diagram addresses the handover procedure when UE moves from an old CP AN 2a to a new CP AN 2b, i.e. the case when the RAN node is co-located with the CP entity. In the example shown in FIG. 8 the user plane traffic has a mobility anchor point which is unchanged during mobility. There may be more than one anchor point as well, as indicated by Anchor AN1 and Anchor AN 2. In box 3, the serving CP AN 2b (indicated new CP AN in the figure) is updated and context information is replicated to all other CP ANs. Box 3 is shown as a double box to indicate that the updated parameter is subject to the replication process. The anchor ANs Anchor AN1, Anchor AN2 also get the information about updated serving CP AN 2b, and from this they know that the UE has moved to the new CP AN 2b. In this way the anchor CP AN can change the routing of the downlink user plane packets and route them to the new AN without any additional signaling messages. Therefore it is possible to avoid messages such as Path Switch Request/Ack towards the anchor points. Signaling messages between the new CP AN and the anchor ANs Anchor 1, Anchor 2 are thereby eliminated.

Figure 9:
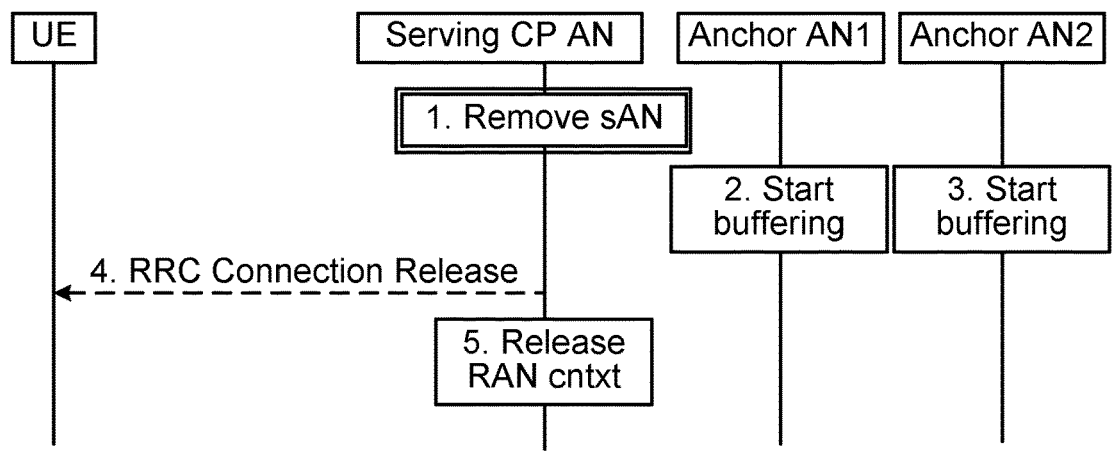
FIG. 9 illustrates a signaling diagram of a system simplification during idle to connected states according to the present teachings.

FIG. 9 illustrates a signaling diagram of a system simplification during idle to connected states according to the present teachings.

Similar simplifications could be done in the case of connected to idle transition, as shown in FIG. 9. The serving CP AN can remove the serving CP AN parameter (indicated as sAN in the figure), and owing to the replication of that change (shown by the double box 1 in the figure), other CP ANs (indicated Anchor AN1, Anchor AN2 in the figure) which act as anchor points for the given UE can start buffering data (illustrated at boxes 2 and 3) for any potential downlink data that may arrive. By means of this, it is possible to avoid any additional explicit signaling message towards the anchor ANs (Anchor AN1, Anchor AN2) about the fact that the UE has been released to idle mode. The serving CP AN may then perform a Radio Reconfiguration Control (RRC) connection release (arrow 4) and the serving CP AN may release the RAN functionality context (box 5).

Figure 10:
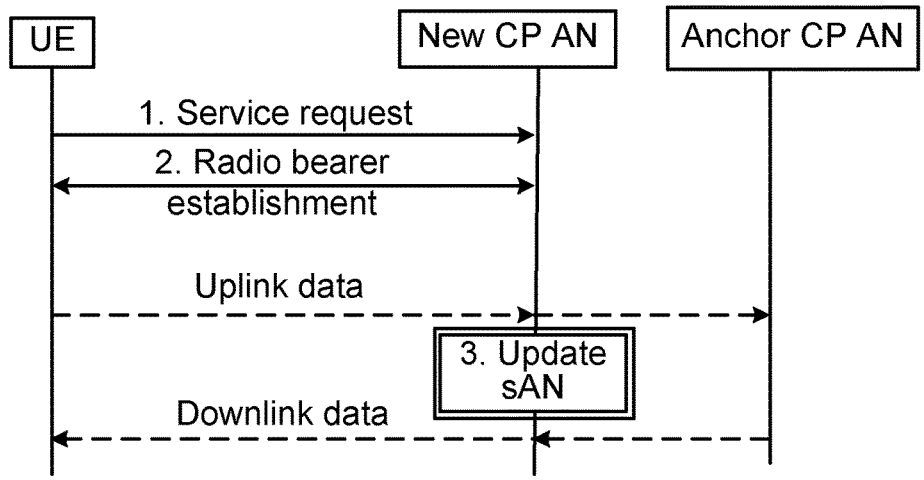
FIG. 10 illustrates a signaling diagram of a system simplification during connected to idle transition according to the present teachings.

FIG. 10 illustrates a signaling diagram of a system simplification enabled by the present teachings, during connected to idle transition. At arrow 1 the idle UE makes a service request towards a new CP AN and in response, at arrow 2, the new CP AN performs radio bearer establishment. For the idle to connected transition, in case of a separate anchor point for the user plane traffic, it is possible to avoid any explicit signaling message between the new serving AN and the anchor AN in case they are different. Just updating the serving CP AN parameter (denoted sAN in FIG. 10) in the new CP AN and using context replication (box 3) is sufficient to notify the anchor CP AN about the currently serving CP AN (i.e. the new CP AN). Hence, the anchor CP AN can route the downlink data appropriately (illustrated by dashed lines from anchor CP AN via new CP AN to the UE). Signaling messages from the new CP AN to the anchor CP AN can be avoided owing to the context replication process in box 3.

Figure 11:
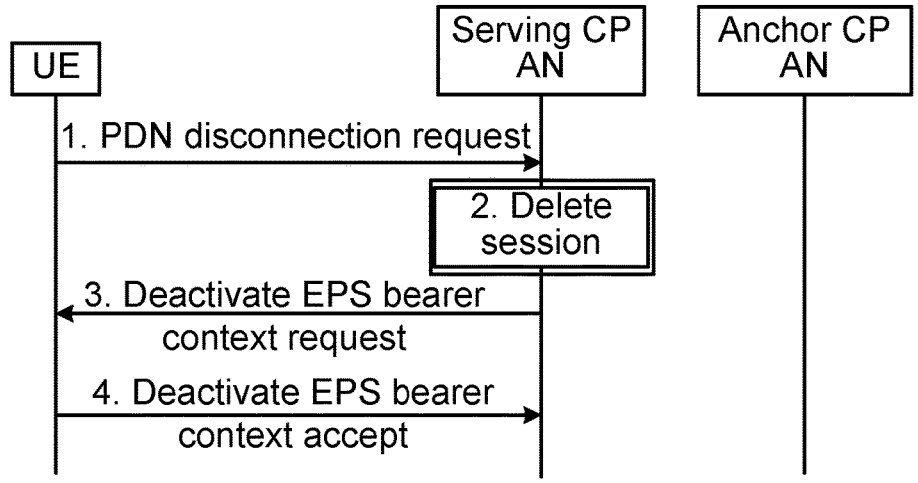
FIG. 11 illustrates a signaling diagram of a system simplification at packet data network disconnection.

FIG. 11 illustrates a signaling diagram of a system simplification at packet data network disconnection. Similar simplification is possible with Evolved Packet System (EPS) bearer procedures. For example, in case a PDN connection is to be removed (arrow 1), the serving CP AN may delete the session locally (box 2), and use context replication (indicated by double lined box 2) to remove the session at another anchor AN (when applicable) without additional signaling messages. For sake of completeness, arrow 3 illustrates deactivation of EPS bearer context request from the serving CP AN to the UE, and arrow 4 illustrates a deactivation EPS bearer context accept message as response from the UE to the serving CP AN.

In the following, some aspects and features related to a CP entity in a mobile system and provided by the present teachings are summarized:

The CP entity includes CN CP functionality such as the termination of NAS signaling with the UE and handling the associated system procedures;

The CP entity is responsible for a limited service area;

The CP entity's context information (i.e., memory state associated with a given UE) is replicated in all other local CP entities belonging to a given context replication domain, where some of those local CP entities may serve a different area;

Any change in the state for one UE of one CP entity is automatically propagated to the other local CP entities in the context replication domain.

In a preferred embodiment of the invention, the CP entity is collocated with the RAN functionality entity (e.g. BS or eNB), and the CP entity's service area corresponds to the coverage of the RAN functionality entity.

The various features and embodiments that have been described may be combined in different ways, examples of which are given in the following, with reference first to FIG. 12.

Figure 12:
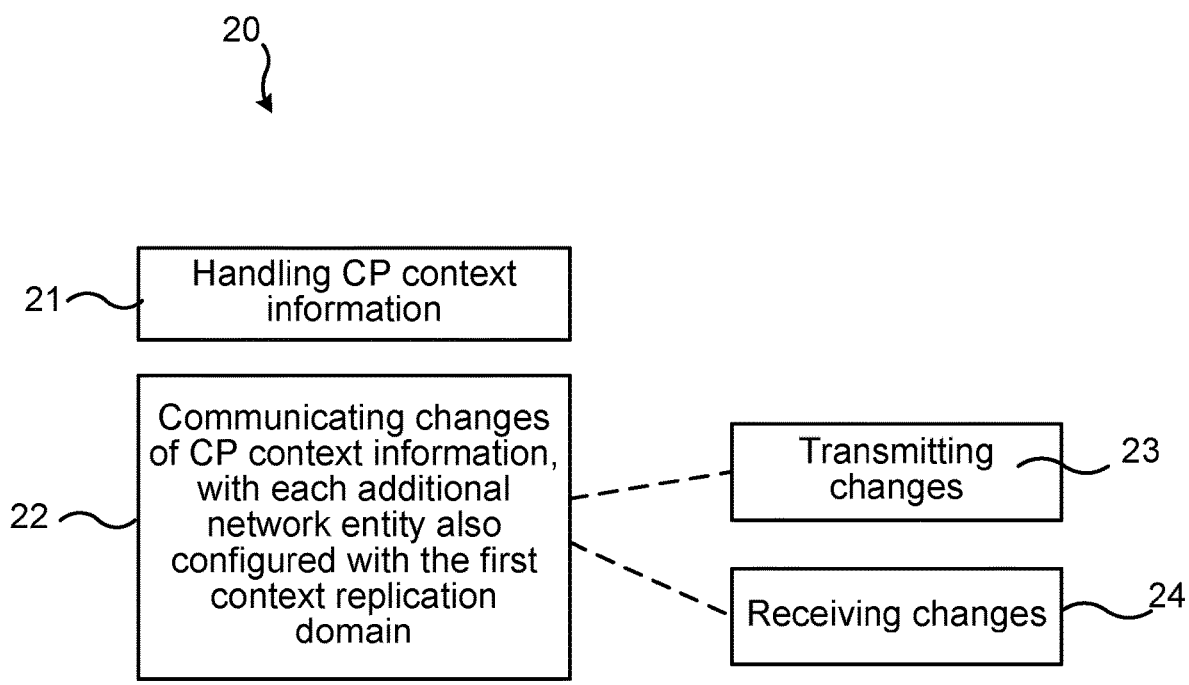
FIG. 12 illustrates a flow chart over steps of an embodiment of a method in a network node in accordance with the present teachings.

FIG. 12 is a flow chart over steps of a method in accordance with the present teachings.

A method 20 for a first network entity 2a of handling control plane context information relating to wireless devices 5 is provided. The first network entity 2a is configured with a first context replication domain. The context replication domain may be defined as a given set of local CP entities 2a, 2b, 2c which all exchange UE contexts according to what has been described. In the context replication domain all local CP entities 2a, 2b, 2c exchange information such that the same UE contexts are available in all CP entities.

The method 20 comprises handling 21 control plane context information relating to one or more wireless devices 5.

The method 20 comprises communicating 22, with each additional network entity 2b, 2c also configured with the first context replication domain, changes of control plane context information for the one or more wireless devices 5.

In different embodiments, the communicating 22 comprises:

transmitting 23 to each additional network entity 2b, 2c also configured with the first context replication domain, changes of control plane context information relating to wireless devices 5, and/or receiving 24, from each additional network entities 2b, 2c also configured with the first context replication domain, changes of control plane context information relating to wireless devices 5.

The first network entity 2a, as all additional network entities 2b, 2c also configured with the same context replication domain, is preferably both transmitting 23 all changes to and receiving 24 any changes from each of the other network entities. However, some entities might only transmit 23 to other entities or only receive 24 from other entities.

In different embodiments, the handling of control plane context information comprises handling security context and/or bearer context relating to the one or more wireless devices 5 served by the first network entity 2a.

In various embodiments, the changes of control plane context information for the one or more wireless devices 5 comprise one or more of: changes of security context, changes to bearer context, updates of count changes of counter for non-access stratum messages, changes to parameters relating to number of paging attempts and changes of any single information element of the control plane context information changing for the one or more wireless devices 5.

In different embodiments, the communicating 22 changes of control plane context information is performed continuously for each change of control plane context information or simultaneously for each change of control plane context information occurred within a configurable amount of time.

In an embodiment, the first network entity 2a is configured with an address or multiple addresses that correspond to each additional network entity 2b, 2c which is also configured with the first context replication domain.

In an embodiment, the first network entity 2a is co-located or integrated with a radio base station communicating wirelessly with the wireless device 5. In embodiments wherein the first network entity 2a (CP entity) is collocated with the base station, a simpler network deployment and operation is provided owing to having only one type of node instead of separate BS and first network entity 2a (CN CP). A reduced control plane delay is provided owing to such colocation of the CN CP context with the BS role.

In various embodiments, the first context replication domain comprises a set of network entities 2a, 2b, 2c in which all network entities communicate changes of control plane context information relating to the one or more wireless devices 5 with each other, such that all network entities in the set comprise replications of control plane context information relating to the one or more wireless devices 5 served within any of their respective service areas 3a, 3b, 3c.

Figure 13:
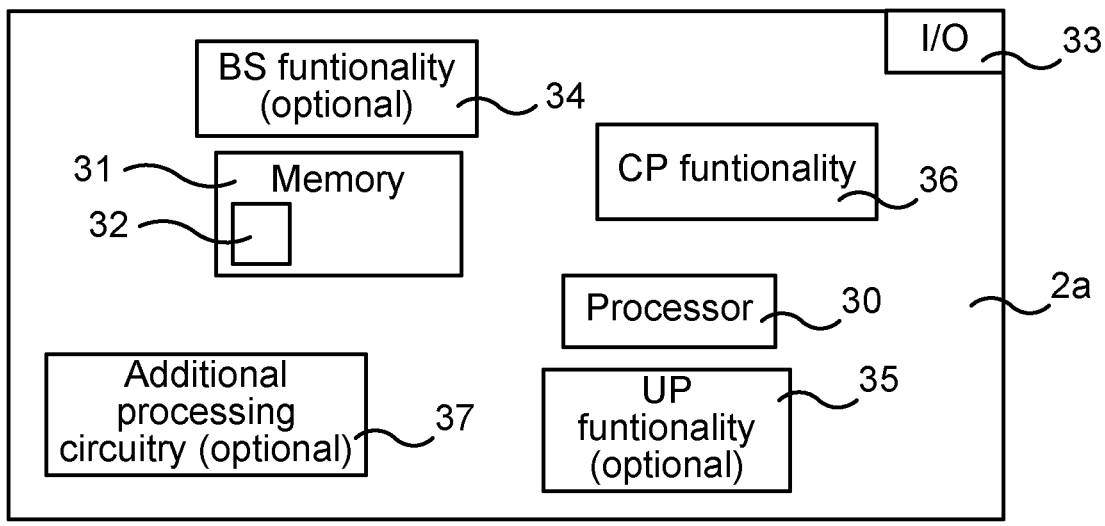
FIG. 13 illustrates schematically a network node and means for implementing embodiments of the method in accordance with the present teachings.

FIG. 13 illustrates schematically a first network entity 2a of a communications network and means for implementing embodiments according to the present teachings.

The first network entity 2a comprises control plane functionality 36. The control plane handles radio-specific functionality which depends on the state of the user equipment (idle or connected). The control plane functionality 36 may, for instance, comprise termination of non-access stratum (NAS) signaling with wireless devices and handling the associated signaling procedures, and functions such as setting up and updating of the user plane path for the UE's data traffic, handling the attachment and detachment of the UE, handling the area registration signaling of the UE, etc.

The first network entity 2a comprises a processor 30 comprising any combination of one or more of a central processing unit (CPU), multiprocessor, microcontroller, digital signal processor (DSP), application specific integrated circuit etc. capable of executing software instructions stored in a memory 31 which can thus be a computer program product 31. The processor 30 can be configured to execute any of the various embodiments of the method for instance as described in relation to FIG. 12.

The memory 31 can be any combination of read and write memory (RAM) and read only memory (ROM), Flash memory, magnetic tape, Compact Disc (CD)-ROM, digital versatile disc (DVD), Blu-ray disc etc. The memory 31 may also comprise persistent storage, which, for example, can be any single one or combination of magnetic memory, optical memory, solid state memory or even remotely mounted memory.

The first network entity 2a may comprises an input/output device 33 (indicated by I/O in FIG. 13) for communicating with other network entities and nodes. As mentioned earlier, the local CP entities 2a, 2b, 2c may be interconnected in a wired or wireless manner for exchange of information, e.g. the control plane contexts. The input/output device 33 may comprise means, e.g. interfaces, protocol stacks etc., also for such information exchange. Such interface 33 may comprise a wireless communication interface (e.g. radio interface) and/or wired communication interface. For instance, in case the first network entity 2a is collocated with the base station, an X2 interface interconnecting the base stations may be used.

The first network entity 2a may comprise additional processing circuitry, schematically indicated at reference numeral 37, for implementing the various embodiments according to the present teachings.

The first network entity 2a may optionally, in some embodiments, comprise user plane functionality 35 or be integrated with an entity handling user plane functionality. User plane functionality 35 may comprise providing user information for flow transfer and associated controls, e.g. flow control, error recovery etc.

The first network entity 2a may optionally, in some embodiments, comprise base station functionality 34 or be integrated with an entity handling base station functionality. Such base station functionality 34 may comprise UE signaling related functions, e.g. transmitter and receiver functionality.

The first network entity 2a may also comprise additional processing circuitry, schematically indicated at reference numeral 37 for implementing the various embodiments according to the present teachings.

The present teachings provide computer programs 52 for the first network entity 2a for handling control plane context information relating to wireless devices 5. The computer program 32 comprises computer program code, which, when executed on at least one processor 30 of the first network entity 2a causes the first network entity 2a to perform the method 20 according to any of the described embodiments thereof.

The present disclosure also encompasses computer program products 31 comprising a computer program 32 for implementing the embodiments of the method as described, and a computer readable means on which the computer program 32 is stored. The computer program product 31 may, as mentioned earlier, be any combination of random access memory (RAM) or read only memory (ROM), Flash memory, magnetic tape, Compact Disc (CD)-ROM, digital versatile disc (DVD), Blu-ray disc etc.

A first network entity 2a is provided for handling control plane context information relating to wireless devices 5. The first network entity 2a is configured with a first context replication domain. The first network entity 2a is further configured to:

handle control plane context information relating to one or more wireless devices 5, and communicate, with each additional network entity 2b, 2c also configured with the first context replication domain, changes of control plane context information for the one or more wireless devices 5.

The first network entity 2a may be configured to perform the above steps e.g. by comprising one or more processors 30 and memory 31, the memory 31 containing instructions executable by the processor 30, whereby the first network entity 2a is operative to perform the steps. In case of several processors 30 (not illustrated) they may be configured to perform all steps of the method 20 or only some of the steps.

In an embodiment, the first network entity 2a is configured to communicate by:

transmitting to each additional network entity 2b, 2c also configured with the first context replication domain, changes of control plane context information relating to wireless devices 5, and/or receiving, from each additional network entities 2b, 2c also configured with the first context replication domain, changes of control plane context information relating to wireless devices 5.

In various embodiments, the control plane context information comprises security context and/or bearer context relating to the one or more wireless devices 5 served by the first network entity 2a.

In various embodiments, the changes of control plane context information for the one or more wireless devices 5 comprise one or more of: changes of security context, changes to bearer context, updates of count changes of counter for non-access stratum messages, changes to parameters relating to number of paging attempts and changes of any single information element of the control plane context information changing for the one or more wireless devices 5.

In an embodiment, the first network entity 2a is configured to communicate changes of control plane context information continuously for each change of control plane context information or simultaneously for each change of control plane context information occurred within a configurable amount of time. The frequency at which the changes of control plane context information may hence be adapted to particular needs. The updated control plane context information may be changed upon each and every change, or changes occurring within a certain time period may be updated simultaneously.

In an embodiment, the first network entity 2a is configured with an address or multiple addresses that correspond to each additional network entity 2b, 2c which is also configured with the first context replication domain.

In an embodiment, the first network entity 2a is co-located or integrated with a radio base station communicating wirelessly with the wireless device 5. In such embodiments, the control plane functionality may be integrated with the base station functionality.

In an embodiment, the first context replication domain comprises a set of network entities 2a, 2b, 2c in which all network entities communicate changes of control plane context information relating to the one or more wireless devices 5 with each other, such that all network entities in the set comprise replications of control plane context information relating to the one or more wireless devices 5 served within any of their respective service areas 3a, 3b, 3c.

Figure 14:
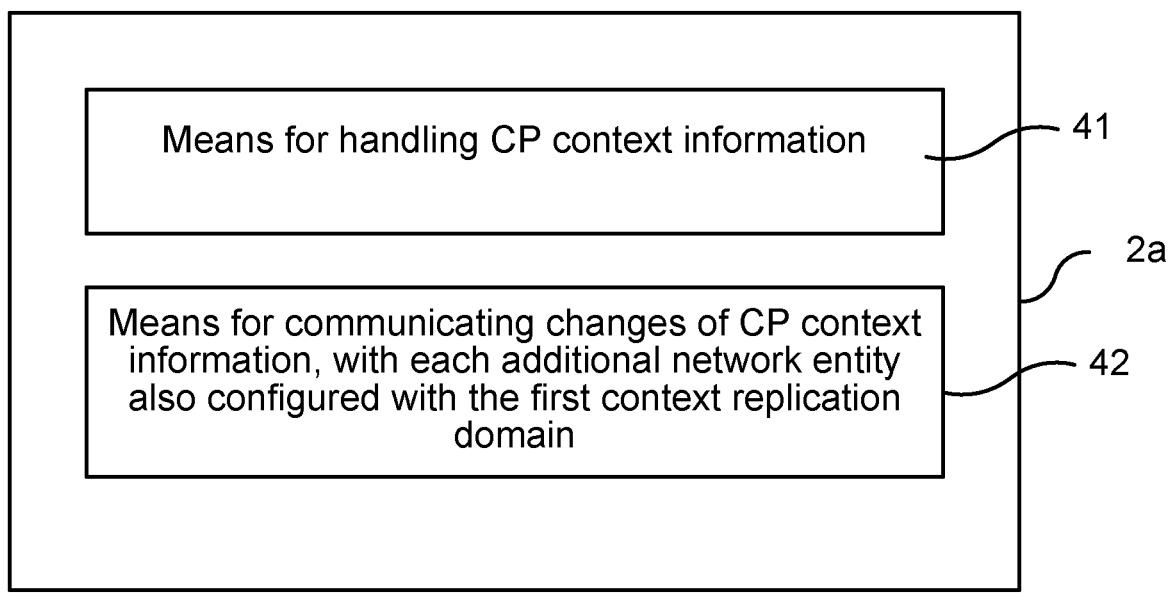
FIG. 14 illustrates a network node comprising function modules/software modules for implementing embodiments of the present teachings.

FIG. 14 illustrates a network entity 2a comprising function modules/software modules for implementing embodiments according to the present teachings. In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A first network entity of handling control plane context information relating to wireless devices is provided. The first network entity is configured with a first context replication domain.

The first network entity comprises first means 41 for handling 21 control plane context information relating to one or more wireless devices 5. Such first means 41 may comprise processing circuitry adapted for such handling, e.g. processing circuitry 37 as described in relation to FIG. 13 adapted for such handling.

The first network entity comprises second means 42 for communicating, with each additional network entity also configured with the first context replication domain, changes of control plane context information for the one or more wireless devices.

Such second means 42 may for instance comprise processing circuitry for receiving and/or transmitting and/or a communication interface (e.g. units 33 and/or 37 described with reference to FIG. 13).

The first network entity may comprise still further means for implementing the various steps and variations of the steps according to the present teachings. Such additional means may comprise processing circuitry suitable adapted and/or analog processing means and/or digital processing means or any combination thereof.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for a first network entity of handling control plane context information relating to wireless devices, the first network entity being configured with a first context replication domain, the method comprising:
    handling control plane context information relating to a wireless device, and
    communicating, with each additional network entity also configured with the first context replication domain, changes of control plane context information for the wireless device;
    wherein the communicating comprises:
        transmitting, to each additional network entity also configured with the first context replication domain, changes of control plane context information relating to the wireless device, and
        receiving, from each additional network entity also configured with the first context replication domain, changes of control plane context information relating to the wireless device.

2. The method as claimed in claim 1, wherein the handling of control plane context information comprises handling security context and/or bearer context relating to the wireless device served by the first network entity.

3. The method as claimed in claim 1, wherein the changes of control plane context information for the wireless device comprise one or more of: changes of security context, changes to bearer context, updates of count changes of counter for non-access stratum messages, changes to parameters relating to number of paging attempts and changes of any single information element of the control plane context information changing for the wireless device.

4. The method as claimed in claim 1, wherein the communicating changes of control plane context information is performed continuously for each change of control plane context information or simultaneously for each change of control plane context information occurred within a configurable amount of time.

5. The method as claimed in claim 1, wherein the first network entity is configured with an address or multiple addresses that correspond to each additional network entity which is also configured with the first context replication domain.

6. The method as claimed in claim 1, wherein the first network entity is co-located or integrated with a radio base station communicating wirelessly with the wireless device.

7. The method as claimed in claim 1, wherein the first context replication domain comprises a set of network entities in which all network entities communicate changes of control plane context information relating to the wireless device with each other, such that all network entities in the set comprise replications of control plane context information relating to the wireless device served within any of their respective service areas.

8. A non-transitory computer-readable storage medium comprising a computer program product for a first network entity for handling control plane context information relating to wireless devices and including instructions to cause at least one processor to:
    handle control plane context information relating to a wireless device, and
    communicate, with each additional network entity also configured with the first context replication domain, changes of control plane context information for the wireless device;
    wherein the instructions to cause the at least one processor to communicate changes of control plane context information comprise instructions to cause the at least one processor to:
        transmit, to each additional network entity also configured with the first context replication domain, changes of control plane context information relating to the wireless device, and receive, from each additional network entity also configured with the first context replication domain, changes of control plane context information relating to the wireless device.

9. The non-transitory computer-readable storage medium of claim 8, wherein to handle the control plane context information comprises handling security context and/or bearer context relating to the wireless device served by the first network entity.

10. The non-transitory computer-readable storage medium of claim 8, wherein the changes of control plane context information for the wireless device comprise one or more of: changes of security context, changes to bearer context, updates of count changes of counter for non-access stratum messages, changes to parameters relating to number of paging attempts and changes of any single information element of the control plane context information changing for the wireless device.

11. A first network entity for handling control plane context information relating to wireless devices, the first network entity being configured with a first context replication domain, the first network entity further being configured to:
handle control plane context information relating to a wireless device, and
communicate, with each additional network entity also configured with the first context replication domain, changes of control plane context information for the wireless device;
wherein the first network entity is configured to communicate by being configured to:
transmit, to each additional network entity also configured with the first context replication domain, changes of control plane context information relating to the wireless the device, and
receive, from each additional network entity also configured with the first context replication domain, changes of control plane context information relating to the wireless device.

12. The first network entity as claimed in claim 11, wherein the control plane context information comprises security context and/or bearer context relating to the wireless device served by the first network entity.

13. The first network entity as claimed in claim 11, wherein the changes of control plane context information for the wireless device comprise one or more of: changes of security context, changes to bearer context, updates of count changes of counter for non-access stratum messages, changes to parameters relating to number of paging attempts and changes of any single information element of the control plane context information changing for the wireless device.

14. The first network entity as claimed in claim 11, configured to communicate changes of control plane context information continuously for each change of control plane context information or simultaneously for each change of control plane context information occurred within a configurable amount of time.

15. The first network entity as claimed in claim 11, wherein the first network entity is configured with an address or multiple addresses that correspond to each additional network entity which is also configured with the first context replication domain.

16. The first network entity as claimed in claim 11, wherein the first network entity is co-located or integrated with a radio base station communicating wirelessly with the wireless device.

17. The first network entity as claimed in claim 11, wherein the first context replication domain comprises a set of network entities in which all network entities communicate changes of control plane context information relating to the wireless device with each other, such that all network entities in the set comprise replications of control plane context information relating to the wireless device served within any of their respective service areas.

* * * * *